United States Patent [19]

Kafri et al.

[11] Patent Number: 4,590,681

[45] Date of Patent: May 27, 1986

[54] LEVEL BASED ON MOIRE EFFECT WITH AMBIENT LIGHT

[75] Inventors: Oded Kafri, Beer-Sheva; Aminadav Livnat; Eliezer Keren, both of Arad, all of Israel

[73] Assignee: The State of Israel, Atomic Energy Commission, Nuclear Research Center Negev, Beer-Sheva, Israel

[21] Appl. No.: 686,923

[22] Filed: Dec. 27, 1984

[30] Foreign Application Priority Data

Jan. 2, 1984 [IL] Israel .......................................... 70596

[51] Int. Cl.$^4$ .............................................. G01C 9/20
[52] U.S. Cl. ......................................... 33/378; 33/396
[58] Field of Search ................ 33/378, 397, 396, 377, 33/367, 390, 373; 250/237 G

[56] References Cited

U.S. PATENT DOCUMENTS

| | | | |
|---|---|---|---|
| 2,525,387 | 10/1950 | Volk | 33/378 |
| 2,587,878 | 3/1952 | Nachtrieb | 33/378 |
| 2,767,483 | 10/1956 | Sauer, Jr. | 33/390 |
| 3,023,512 | 3/1962 | Morris et al. | 33/378 |
| 3,711,178 | 1/1973 | Humphrey | 33/378 |
| 3,842,512 | 10/1974 | Stoltz et al. | 33/378 |

*Primary Examiner*—Willis Little
*Attorney, Agent, or Firm*—Steinberg & Raskin

[57] ABSTRACT

A level comprises a sealed casing which holds a liquid and has a flat bottom end. It also includes a light admissive top section, bearing a periodic grating of alternating transparent and opaque stripes. A float is in the liquid inside a compartment of the casing underneath the light admissive top section. The float is capable of changing its position inside the chamber so as to retain its position relative to the horizon when the chamber is filled, and a mirror on the top face of said float.

6 Claims, 9 Drawing Figures

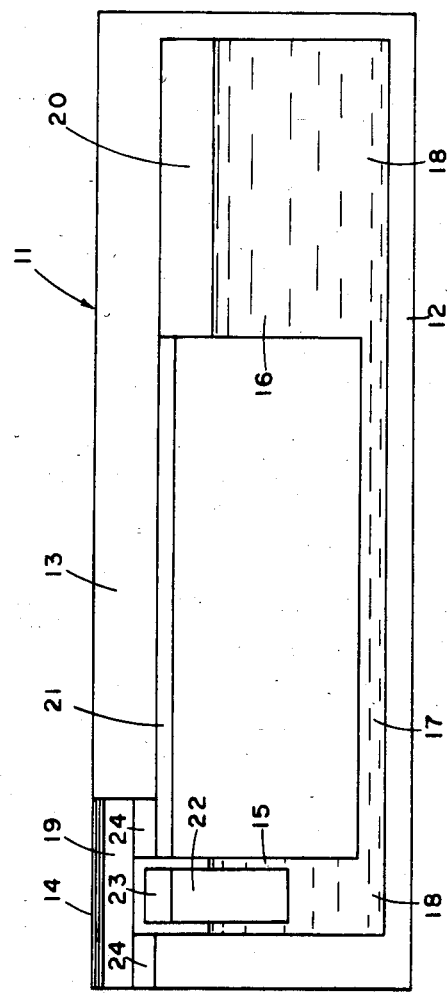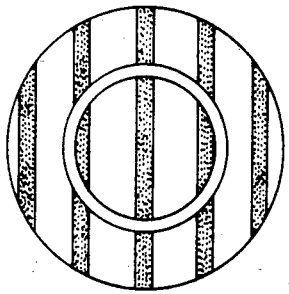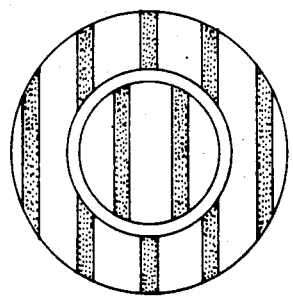

LEVEL BASED ON MOIRE EFFECT WITH AMBIENT LIGHT

BACKGROUND OF THE INVENTION

The present invention concerns levels for measuring the horizontality of flat surfaces.

Measuring the horizontality of flat surfaces is important in many engineering tasks. Most conventional levels are based on the motion of an air bubble in water in a sealed transparent tube, placed on a ruler with a flat base. These levels vary in dimension, price and accuracy. While these known levels are popular on account of their low price and the fact that they consist of a single convenient and robust unit, they have the disadvantage of having a relatively low degree of sensitivity and a low dynamic range.

Livnat and Kafri, Rev. Sci. Inst. 53, 1779 (1982) have suggested a level based on moire deflectometry (see also Kafri, Optics Letters 5, 555 (1980), and Phys. Bull. 33, 197 (1982) which is of high accuracy down to $10^{-5}$ rad, has a high dynamic range and may provide absolute measurement of any inclination angle. However, this level requires a collimated light beam and thus it is not suitable for use in construction and other heavy duty jobs where collimated light sources are not available.

SUMMARY OF THE INVENTION

It is an object of the present invention to provide a new, highly accurate level, having a high dynamic range, based on a moire-like deflectometry but at the same time utilizing diffusive light.

In the following specification and claims the expression "bottom" and "top" when used in relation to a level signify two opposite outer surfaces which in the operative position form the bottom and top respectively.

The present invention is based on the novel observation that in diffusive light a periodic grating of alternating transparent and opaque stripes, a so-called Ronchi ruling, and its virtual image produced by a mirror, produce moire fringe patterns.

Based on this observation the present invention provides a level comprising a sealed casing holding a liquid and having a flat bottom end and parallel thereto, a light admissive top section bearing a periodic grating of alternating transparent and opaque stripes; a float in said liquid inside a compartment of said casing underneath said light admissive top section, which float is capable of changing its position inside said chamber so as to retain its position relative to the horizon when the chamber is tilted; and a mirror on the top face of said float.

The liquid inside the compartment may completely fill the latter and in this case the mirror is submerged. Alternatively, the liquid may fill only part of the compartment and in this case the mirror may emerge out of the liquid.

In accordance with one embodiment of the invention the mirror on the top face of said carrier body is of circular concave spherical shape.

In accordance with another embodiment of the invention the mirror on top of said float is a flat centrosymmetric disc, e.g. circular or rectangular, surrounded by a fixed flat annular mirror whose contours match the edges of said flat mirror.

In operation the operator views the level according to the invention at an angle whereby a moire pattern is observed. If the level is in a fully horizontal state the observed moire pattern is "regular", for example in the form of concentric alternating dark and light circles centered on the center of the mirror in the case of a mirror of circular concave spherical shape. If the level is tilted out of the horizontal position the moire pattern becomes "irregular" which in the case of the foregoing example of a circular spherical concave mirror, means that the pattern of concentric alternating dark and light circles moves off center with respect to the mirror.

It has been found that levels according to the invention are very reliable and highly sensitive and have a high dynamic range.

BRIEF DESCRIPTION OF THE DRAWINGS

The invention is illustrated, by way of example only, in the accompanying drawings in which:

FIG. 6 is a vertical section through another embodiment of a level according to the invention;

FIG. 7 illustrates a deflection pattern of a level according to FIG. 6 when in horizontal position;

FIG. 8 illustrates a deflection pattern of a level according to FIG. 6 when inclined.

DESCRIPTION OF THE PREFERRED EMBODIMENTS

Figure 1:
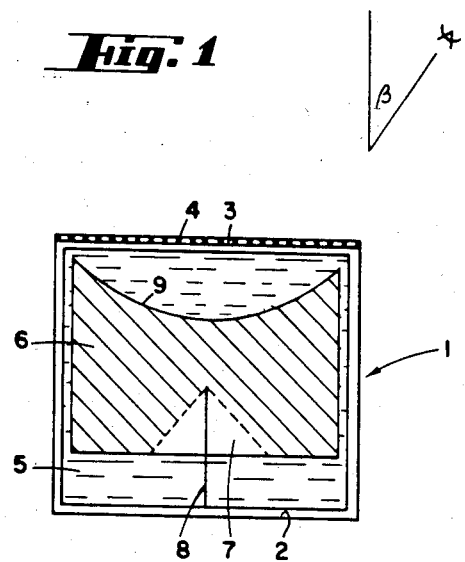
FIG. 1 is a vertical section through one embodiment of a level according to the invention.

The level according to the invention shown in FIG. 1 comprises a casing 1 having a flat bottom 2 and parallel thereto a transparent top section 3 bearing a periodic grating 4 of alternating transparent and opaque stripes.

Casing 1 holds a body of liquid 5, e.g. water, within which is located a float 6 having on its lower face a conical cavity 7 whose apex is mounted with a universal joint on a pivot 8 anchored in bottom 2 of casing 1. This arrangement imparts to the float an indefinite number of degrees of freedom for tilting relative to the chamber. Pivot 8 may be replaced by a cord. The upper face of float 6 is of circular concave spherical shape and is lined with a correspondingly shaped mirror 9. In this embodiment the float 6 is totally submerged and pivot or cord 8 serves also to constrain and prevent it from moving upward.

Figure 2:
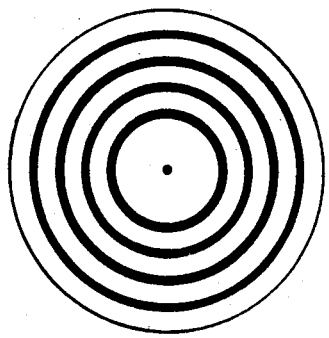
FIG. 2 shows diagrammatically a deflection pattern of the level according to FIG. 1 when in horizontal position.
Figure 3:
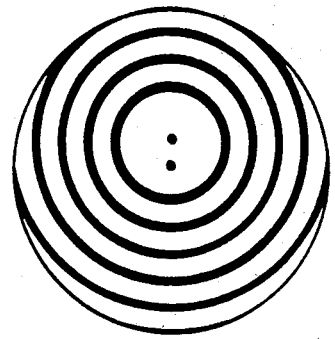
FIG. 3 shows diagrammatically a deflection pattern of the level according to FIG. 1 when inclined.

In operation, the level of FIG. 1 is placed on a surface whose horizontality is to be determined with the bottom face 2 resting on the surface. The operator views the level 1 at an angle $\beta$ with the vertical as shown in FIG. 1. If the surface is completely horizontal so that an imaginary plane tangential to the apex of mirror 9 is parallel to the grating 4, the operator sees a "regular" moire pattern consisting of alternating concentric white and dark or light and grey circles whose center coincides with that of the perimeter of the concave mirror, as shown in FIG. 2. Where, however, the surface on which the level rests is not horizontal with the consequence that said imaginary tangential plane is no longer parallel to grating 4, the deflection pattern is shifted off center as shown in FIG. 3. Any such shift is easily discernible so that any non-horizontality is readily detected.

Figure 4:
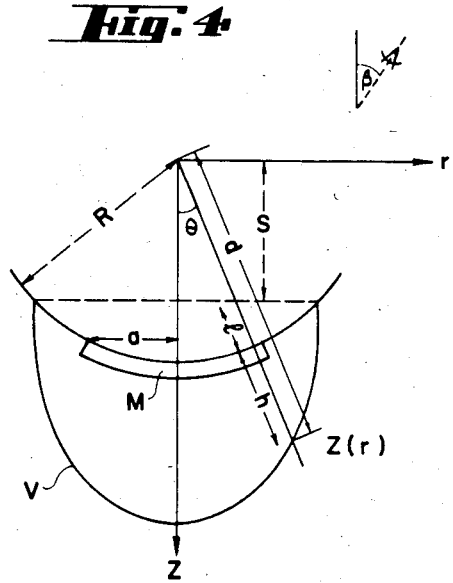
FIGS. 4 and 5 are geometrical representations to illustrate the optics of a level according to the invention.

The theory of the level according to the invention will now be explained briefly with reference to FIGS. 4 and 5. FIG. 4 shows the geometry of the device in the "regular" position in which an imaginary plane that is tangential to the apex of the spherical concave mirror is parallel to the grating. In FIG. 4 M is a circular concave spherical mirror of radius R and a grating is placed at a distance S from the center of the sphere. The system is described in cylindrical coordinates Z and r. When S is larger than R/2 the grating has a virtual image located on a surface V whose equation Z(r) will now be derived.

According to the mirror equation $$\frac{1}{l} - \frac{1}{h} = \frac{1}{f} = \frac{2}{R} \tag{1}$$

For l and h see FIG. 4.

$$l = R - \frac{S}{\cos\theta} \,;\, d = \frac{Z}{\cos\theta} \,;\, h = d - R = \frac{Z}{\cos\theta} - R$$

When substituting the above expressions for l and h in formula 1 we obtain:

$$\frac{1}{R - \frac{S}{\cos\theta}} - \frac{1}{\frac{Z}{\cos\theta} - R} = \frac{2}{R} \tag{2}$$

$$\frac{1}{Z} = \frac{2}{R\cos\theta} - \frac{1}{S} \tag{3}$$

with $$\tan\theta = \frac{r}{Z} \tag{4}$$

Substitution of $\theta$ from eq. 3 into eq. 2 gives the equation of the surface Z(r):

$$\left(\frac{4S^2 - R^2}{2S^2R} Z - \frac{R}{2S}\right)^2 + \frac{4S^2 - R^2}{S^2R^2} r^2 = 1 \tag{5}$$

Eq. 4 describes an ellipsoid with axes a and b equal to:

$$a = \frac{2S^2R}{4S^2 - R^2} \,;\, b = \frac{SR}{\sqrt{4S^2 - R^2}} \tag{6}$$

The image of the grating on the surface V is identical to the shadow that would be produced by a point light source at the origin if the mirror were replaced by a real ellipsoid of the form Z(r) having a diffusive surface. The interference between the shadow and the original grating as observed from an angle $\beta$ (FIG. 4) produces fringes which are the surface contours of the ellipsoid and which are in the form of concentric circles, provided the distances of the observer and point source from the grating are much larger than the distance between the grating and its shadow (see also Meadows, Johnson and Allen, Appl. Optics 9, 942 (1970)). In a level according to the invention this is always a good assumption.

The contours of the ellipsoid are concentric circles which correspond to equispaced Z values:

$$Z = Z_0 + np\cot\beta \tag{7}$$

where $Z_0$ is a constant phase factor, p is the pitch of the grating and n is an integer.

As mentioned, the configuration of FIG. 4 describes a situation where an imaginary plane tangential to the apex of the circular concave spherical mirror M is parallel to the grating and consequently the normal to the grating is exactly parallel to the axis of the mirror. In this case the fringes will be concentric with the perimeter of the circular mirror, as shown in FIG. 2.

Figure 5:
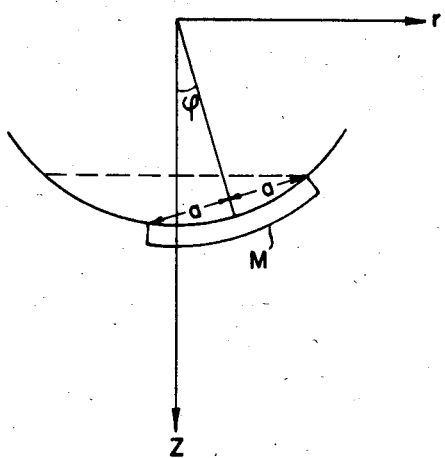

When the surface on which the level rests is not horizontal and in consequence the mirror axis is no longer perpendicular to the grating and corresponds to the configuration in FIG. 5, the center of the fringe pattern does no longer coincide with that of the mirror as shown in FIG. 3. The deviation of the fringe center from the axis is easily calculated from FIG. 5 to be $$\Delta r = R \sin\phi \approx R\phi \tag{8}$$

where the angle $\phi$ in rad between the axes of the grating and the mirror equals the angle between the grating and the plane tangent to the mirror at the apex.

The system of the level according to the invention as shown in FIG. 1 and whose geometry is shown in FIGS. 4 and 5 can be equated to a pendulum of length R. Thus with a compact instrument it is possible to attain the accuracy of a long pendulum. This is due to the fact that the moire effect amplifies the motion of the mirror by a factor R/a where a is the radius of the specular section as shown in FIGS. 4 and 5.

The sensitivity of the instrument, namely the minimum measurable angle, will now be calculated. It is normally not necessary to have the pattern move by a whole fringe in order to detect fringe shifts. A fraction 1/F, where F≈10, is easily detected by the human eye without the need of fringe detection equipment. Thus the shift $\Delta r$ in the pattern (cf. eq. 8) is:

$$r = r_0/F \tag{9}$$

where $r_0$ is the radius of the innermost fringe. For $r_0 < < R$ it is calculated by substituting Z from eq. 7 into eq. 5:

$$r_o = \sqrt{\frac{Rp}{\tan\beta}} \tag{10}$$

From eqs. 8-10 we obtain the minimum detectable angle as:

$$\phi_{min} = \frac{1}{F} \sqrt{\frac{p}{R\tan\beta}} \tag{11}$$

Eq. 11 implies that $\phi_{min}$ could be made as small as desired by increasing R. This parameter cannot however be made larger than the value which makes the fringe radius $r_o$ in eq. 10 larger than a, the radius of the circular mirror (FIG. 4=. Putting $r_o = a$ in eq. 10 and multiplying through with eq. 11 yields.

$$\phi_{min} = \frac{p}{aF\tan\beta} \quad (12)$$

It is seen here that the curvature radius R has dropped out of the expression for $\phi_{min}$. Eq. 12 holds also for $R=\infty$, and in this limit it expresses $\phi_{min}$ as the angle where 1/F of a fringe is seen on a flat mirror.

In the embodiment of the invention shown in FIG. 1, float 6 is adapted to tilt freely in any direction on pivot 8. This has the advantage that the level can indicate a deviation from horizontal in any direction. However, it has been found that the accuracy of levelling in the direction of the observer is much lower than in the perpendicular direction. Accordingly, in another embodiment of a level according to the invention with a mirror of circular concave spherical shape, the float is held on two opposite horizontal pivots anchored in the side walls of casing 1 and in this way it retains only one single degree of freedom for tilting. This means that deviation from horizontality can be determined in one direction but the accuracy of levelling is improved. In this case it is necessary to place the grating with the pattern lines perpendicular to the direction of observation.

As already mentioned, it follows from equation 11 above that the larger is R, the more sensitive is the instrument. This implies that the highest sensitivity will be achieved by increasing R to infinity, or in other words, by making the mirror flat. Such an embodiment is illustrated in FIG. 6 in which a casing 11 has a flat bottom 12 and parallel thereto a top 13 comprising a light admissive section 14 bearing a periodic grating of alternating transparent and opaque stripes. Underneath top section 14 is located a cylindrical chamber 15 forming together with a second chamber 16 and a communicating duct 17 a pair of communicating vessels holding a body of liquid 18. The air spaces 19 and 20 above the liquid in the communicating chambers 15 and 16 communicate with each other via an air duct 21.

The liquid body inside the cylindrical chamber 15 holds a cylindrical float 22 on whose upper face which emerges out of liquid 18 is mounted a flat circular disc-shaped mirror 23. On circumferential shoulders surrounding the cylindrical chamber 15 there is placed an annular mirror 24 and the arrangement is such that when the level of FIG. 6 is fully horizontal the mirrors 23 and 24 are flush. When, however, the level is not horizontal float 22 rises or sinks inside chamber 15 thereby retaining its position with respect to the horizon. In such a case the mirrors 23 and 24 are no longer flush as is shown by way of example in FIG. 6.

During a tilt of the level according to FIG. 6 in consequence of the surface to be determined not being horizontal, liquid moves between the communicating chambers 15 and 16 so that the surfaces of the liquid body 18 in the communicating chambers 15, 16 remains horizontal and the concomitant equalization of air pressure between spaces 19 and 20 occurs via duct 21.

The "regular" moire pattern observed when mirrors 23 and 24 are flush with each other, is shown in FIG. 7, whereas an "irregular" moire pattern which occurs when the level of FIG. 6 is tilted and mirrors 23 and 24 are no longer flush with each other, is shown in FIG. 8. It is easily understood that the deviation from "regular" to "irregular" is in this case even easier to discern than the off-center shift in the case of the level according to FIG. 1, which means that in practical terms the instrument of FIG. 6 is more sensitive.

Figure 9:
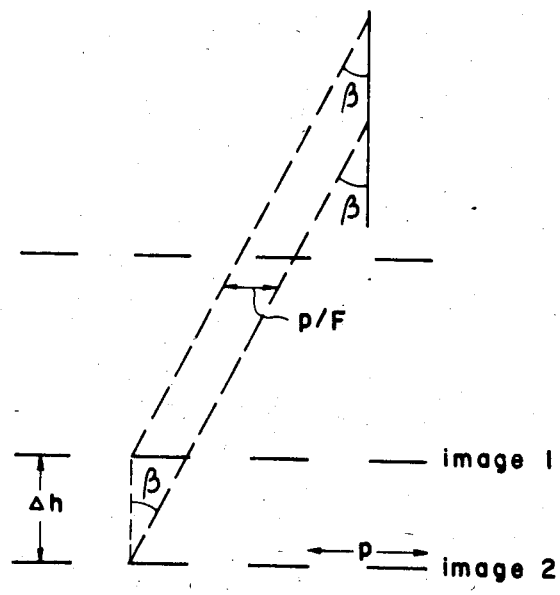
FIG. 9 is a geometrical illustration of some of the properties of the level of FIG. 6.

From FIG. 9 it can be deduced that the difference in height between two mirrors corresponding to a 1/F jump in fringe position is:

$$\Delta h = \frac{p}{2F\tan\beta} \quad (13)$$

The factor 2 appears because the reflected image of the grating moves by $2\Delta h$ when the mirror moves by $\Delta h$.

The minimum detectable angle is thus $$\phi_{min} = \frac{p}{2lF\tan\beta} \quad (14)$$

where l is the distance between the central axes of compartments 15 and 16. When comparing this result with equation 12 above, it is seen that the radius a is replaced here by l which verifies the previous qualitative statement that in the case of the embodiment of FIG. 6 $\phi_{min}$ is smaller, i.e. the sensitivity is higher, than in the case of the embodiment of FIG. 1.

Assuming p=0.1 mm, l=500 mm, F=10, tan $\beta$=1, which are typical values, and inserting these values into equation 14, the resulting sensitivity is $10^{-5}$. This sensitivity can be increased further by increasing the observation angle $\beta$.

We claim:

1. A level comprising a sealed casing holding a liquid and having a flat bottom end and substantially parallel thereto, a light admissive top section bearing a periodic grating of alternating transparent and opaque stripes, said periodic grating comprising, in diffusive light, means for producing together with its virtual mirror image a moire fringe pattern; a float in said liquid inside a compartment of said casing underneath said light admissive top section, which float is capable of changing its position inside said chamber so as to retain its position relative to the horizon when the chamber is filled; and a mirror on the top face of said float.

2. A level according to claim 1 wherein said mirror is of circular concave spherical shape.

3. A level according to claim 2 wherein said compartment is sealed and the float is linked to the bottom thereof in such a way as to have an indefinite number of degrees of freedom for tilting relative to the compartment.

4. A level according to claim 3 wherein said compartment is sealed and the float is pivoted on opposite side walls of the chamber such as to have only one single degree of freedom for tilting relative to the compartment.

5. A level according to claim 1 wherein said mirror is flat and is surrounded by a fixed, flat, annular mirror such that when the level is horizontal the mirrors are flush.

6. A level according to claim 5 wherein the liquid section of said compartment communicates via a liquid duct with a liquid reservoir chamber and air spacer in said compartment and in said liquid reservoir chamber communicate with each other.

* * * * *